No. 711,271. Patented Oct. 14, 1902.
W. ASHCRAFT & J. C. LUBBES.
AUTOMATIC TOGGLE CHAIN RELEASE FOR LOG CARS.
(Application filed June 17, 1902.)
(No Model.) 2 Sheets—Sheet 1.
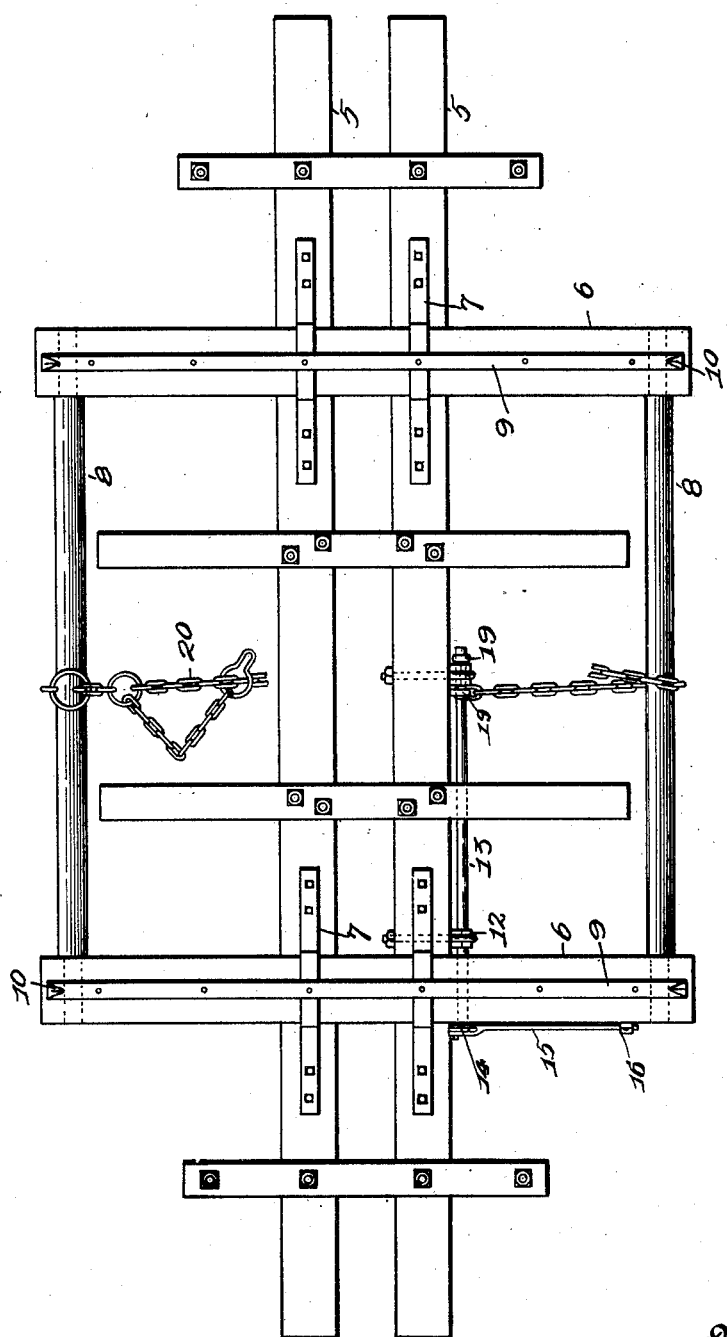

No. 711,271. Patented Oct. 14, 1902.
W. ASHCRAFT & J. C. LUBBES.
AUTOMATIC TOGGLE CHAIN RELEASE FOR LOG CARS.
(Application filed June 17, 1902.)
(No Model.) 2 Sheets—Sheet 2.
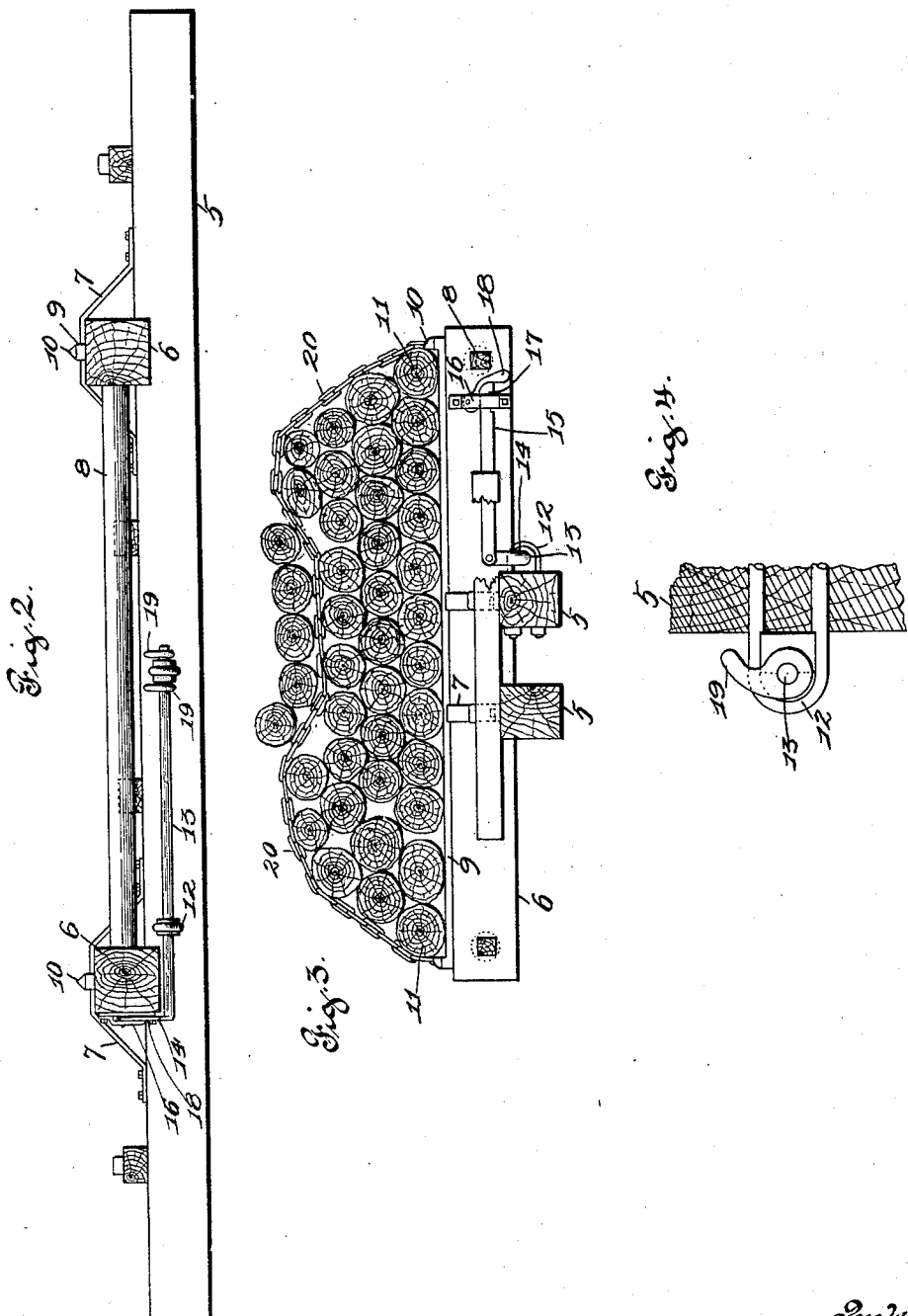

United States Patent Office.

WILLIAM ASHCRAFT AND JULIUS CHARLES LUBBES, OF GREENVILLE, MISSOURI, ASSIGNORS OF ONE-THIRD TO EDWARD G. SWARTZ, OF GREENVILLE, MISSOURI.

AUTOMATIC TOGGLE-CHAIN RELEASE FOR LOG-CARS.

SPECIFICATION forming part of Letters Patent No. 711,271, dated October 14, 1902.

Application filed June 17, 1902. Serial No. 112,053. (No model.)

*To all whom it may concern:*

Be it known that we, WILLIAM ASHCRAFT and JULIUS CHARLES LUBBES, of the city of Greenville, Wayne county, State of Missouri, have invented certain new and useful Improvements in Toggle-Chain Releases for Log-Cars, of which the following is a full, clear, and exact description, reference being had to the accompanying drawings, forming a part hereof.

Our object is to construct an improved toggle-chain release for log-cars and to combine with this an improved log-car bed; and our invention consists of a pair of sills extending longitudinally of the car-bed, a pair of cross-timbers mounted upon the sills, one near each end and extending beyond the sills, metallic strips securing the cross-timbers to the sills, round side bars connecting the ends of the cross-timbers, metallic bars mounted upon the cross-timbers and having upturned ends to form stakes, rock-shaft bearings fixed to one of the sills, a rock-shaft mounted in one of the rock-shaft bearings, means of locking the rock-shaft in a desired position, a hook upon the rock-shaft, a chain connected to one of the round side bars and adapted to pass over the logs around the other side bar and adjustably engage said hook, said hook being of such a shape that when the locking mechanism is released and the rock-shaft allowed to rotate the chain will automatically disengage the hook.

Figure 1 is a top plan view of a log-car bed embodying the principles of our invention. Fig. 2 is a side elevation. Fig. 3 is an end elevation showing logs upon the car-bed. Fig. 4 is a sectional detail, upon an enlarged scale, showing the end of the rock-shaft and the hook carried by the rock-shaft.

Referring to the drawings in detail, the sills 5 extend longitudinally of the car and are supported by the bolsters in the usual way. The cross-timbers 6 are mounted crosswise of the sills, one near each end, and the metallic strips 7 hold the cross-timbers in place. The round side bars 8 connect the outer ends of the timbers 6. The metallic bars 9 are placed upon the timbers 6 and have upturned ends to form stakes 10 to hold the outer logs 11 in place while the other logs are being loaded. The rock-shaft bearings 12 are secured to the side of one of the sills, and the rock-shaft 13 is mounted in said bearings. A crank-arm 14 extends upwardly from one end of the rock-shaft, and the locking-arm 15 is pivotally connected to the outer end of the crank 14. The locking-arm 15 slides through a metallic loop 16 and has a notch 17, in which the loop engages to hold the rock-shaft in its locked position. The eccentric lever 18 holds the locking-bar, with the loop 16, in the notch 17. One or more hooks 19 are rigidly fixed upon the rock-shaft 13. The chain 20 is placed around one of the side bars 8 and passed upwardly over the pile of logs and downwardly around the other side bar 8 and drawn tight and one of the links engaged with one of the hooks 19.

The logs may be piled, as shown in Fig. 3, higher at the sides than at the middle. Then after the chain has been fastened to the hook extra logs may be piled upon the chain in the middle of the load to hold the chain tight.

When it is desired to release the chain, the lever 18 is operated to release the bar 15 to allow the rock-shaft to rotate and disengage the hook 19 from the chain.

The chain may be attached to the bar 8 in any suitable manner, such as that shown.

We claim—

1. In a device of the class described, the combination with a car-bed adapted for carrying logs; of bearings secured to the car-bed; a rock-shaft mounted in the bearings; means of locking the rock-shaft in a desired position; a hook rigidly fixed to the rock-shaft; a chain attached to one side of the car-bed, and adapted to pass over the logs and engage said hook; and means of releasing the rock-shaft to allow the hook to disengage the chain, substantially as specified.

2. In a device of the class described, the combination with a car-bed adapted for carrying logs; of bearings secured to the car-bed; a rock-shaft mounted in the bearings; means of locking the rock-shaft in a desired position; a hook rigidly fixed to the rock-shaft; a chain attached to one side of the car-bed, and adapted to pass over the logs and engage said hook; and means for operating the rock-shaft to allow the hook to disengage the chain, said hook being of such a shape that when the locking mechanism is released, and the rock-shaft allowed to rotate, the chain will automatically disengage the hook, substantially as specified.

In testimony whereof we affix our signatures in presence of two witnesses.

WILLIAM ASHCRAFT.
JULIUS CHARLES LUBBES.

Witnesses:
ELI KLOTZ,
J. H. LUCY.